July 15, 1941.　　　E. S. CORNELL, JR　　　2,249,346
STEAM HEATING SYSTEM AND CONTROL MEANS THEREFOR
Filed Oct. 11, 1938　　　2 Sheets-Sheet 1

INVENTOR
Edward S. Cornell, Jr.
BY
HIS ATTORNEY

July 15, 1941.                E. S. CORNELL, JR                2,249,346
STEAM HEATING SYSTEM AND CONTROL MEANS THEREFOR
Filed Oct. 11, 1938                2 Sheets-Sheet 2

INVENTOR
Edward S. Cornell, Jr.
BY Henry J. Lucke
HIS ATTORNEY

Patented July 15, 1941

2,249,346

UNITED STATES PATENT OFFICE 2,249,346

STEAM HEATING SYSTEM AND CONTROL MEANS THEREFOR

Edward S. Cornell, Jr., Larchmont, N. Y.

Application October 11, 1938, Serial No. 234,502

6 Claims. (Cl. 237—9)

This invention relates to improvements in heating systems.

It is an object of the invention to provide an improved heating system for residences or other occupied buildings, which maintains desired temperatures within relatively close limits by the operation of thermostat control means, and minimizes the "over-run" of temperatures characterizing the usual radiator heating system when under thermostatic control.

It is a further object of the invention to provide a thermostatically controlled, low cost, heating installation, desirably of the one pipe or two pipe steam system, in which heat is substantially immediately available for circulation throughout the room or rooms when a thermostat control reaches its minimal temperature setting.

In this invention, a plurality of heat exchange units may be connected, by conventional piping means, to a boiler or other steam generator. The heating element of each unit or "radiator" is desirably mounted within a suitable casing the size of which provides a suitable passageway between the marginal sides of the heating element and the top, bottom, and lateral sides and the rear wall of the casing. The heating elements are mounted within the casing, suitably forward of the rear wall thereof, and in the space intermediate the heating element and the rear wall, there is located a fan, desirably air-motor driven, and arranged to draw air inwardly from the room around the stated marginal spaces and thence discharge the air, first passing it over the heating surfaces, into the room for heating the same. Each casing assembly may be "concealed" within a wall of the room, in conformity with established practice.

The fan motor means may be operated by compressed air supplied through a suitable piping system. Desirably, such air pressure is generated by an electric-motor-driven air compressor of suitable capacity, and thus, a single electric thermostat may control the periods of operation of the respective air motors by exercising control over the periods of operation of the air compressor. In conformity with such function, the thermostat is preferably of the thermally operated electrical make and break type; the make and break switch thereof is in series electrical connection with a power circuit serving the compressor motor.

Alternatively, electric motor fan operation means may be provided, each fan motor being simultaneously placed in operation upon the suitable actuation of the thermostat.

It is a feature of this invention that the heat exchange units are supplied with steam prior to, or substantially concurrently with, the operation of the fan means. Such operative feature eliminates, in substantial degree, the usual lag between the stage of supply of steam to the usual heat exchangers and the dissemination of heat from such heat exchangers to the atmosphere of the enclosures served by such heat exchangers.

In one form of the present invention, the heat exchange units may be substantially continuously supplied with steam, the "concealment" of the units and the configuration of the casings therefor almost entirely eliminating dissemination of heat by convection. Room thermostat means may control the stages of operation of the fan means, and when the temperature condition of the room drops to the low temperature setting of the thermostat, operation of the fan means immediately circulates warmed air throughout the room.

In other embodiments of the invention, control means are operative to make the supply of steam to the heat exchange units substantially concurrent with the operation of the fan means. Such means may include control over the fan means by temperature or pressure operated electric switches suitably located in the steam-generation or steam distribution components of the heating system.

Suitable arrangement, later described in detail, may be provided for generating hot water for domestic use by the common steam boiler, suitable summer-winter control means affording the all year round operation of the steam boiler, while preventing the passage of steam to the heat exchange units.

Desirably the fan means are operated by air motors, with which may be employed suitable throttling valves to regulate the speed of rotation, and hence the discharge capacity, of the respective fans. Such secondary control provides for regulation of thermal output from each of the said radiators, and makes it possible to accurately balance the heat output of the respective units of the heating system.

The present invention may be used with any conventional type of steam or vapor generating means, and with any conventional type of fuel combustion system. By conventional pressure regulating means, control of the pressure of the vapor within the system may be maintained by the automatic manipulation of dampers in the circumstance of solid fuel combustion, or the regulation of stages of ignition and fuel supply in the circumstance of fluid fuel combustion devices.

As aforesaid, this invention is applicable to heating systems of both the one pipe or two pipe steam type. An advantage of the two pipe system, however, resides in the association, with the supply and return mains of said system, of suitable pump means for circulating cooled water through the radiator units for summer cooling, such pump means being arranged for operation concomitantly with the fan motor means.

Further features and objects of my invention will be more fully understood by the accompanying drawings, in which.

Figure 1:
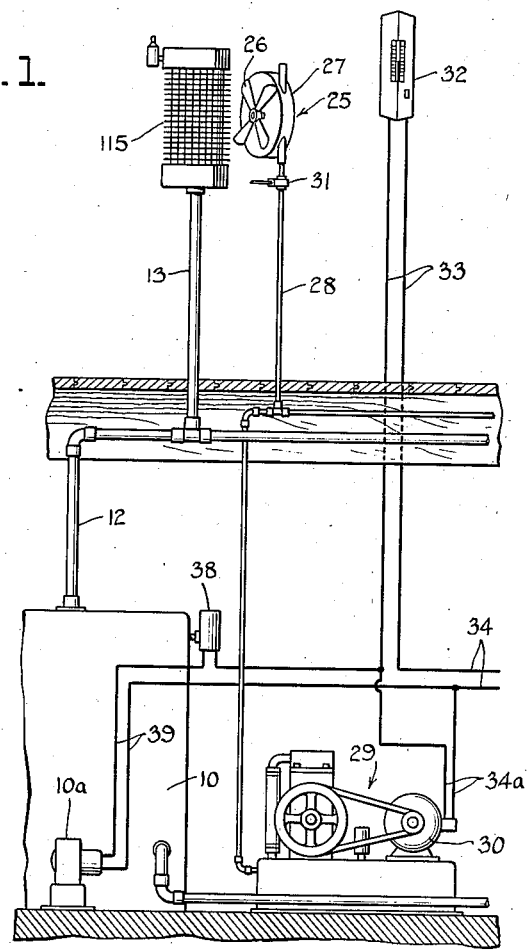
Fig. 1 is a diagrammatic view, largely in side elevation, of a portion of a heating system embodying one form of the present invention.

Figure 1 illustrates my invention in one specific form thereof, namely a one pipe steam heating system in which steam generated within a boiler 10, as by the oil burner 10a or other conventional controllable fuel combustion device, is conducted through piping 12 and branch piping 13 to the inlet of a heat exchange unit 115, hereinafter referred to as a "radiator."

Operatively associated with each radiator is a fan assembly 25, including a fan 26 driven by an air motor 27 operated by compressed air supplied by air compressor 29 through suitable air piping 28. Desirably, the air compressor is driven by an electric motor, as 30.

At each air motor, it is preferred to locate a suitable control valve, as 31, for controlling the speed of rotation of the motor-fan assembly by throttling the input of compressed air to the air motor.

Preferred embodiments of the invention, as diagrammatically illustrated, are controlled by suitable temperature responsive means such as the thermostat 32, located in a selected room or other space of the building or other structure served by the radiator 115, and thereby responsive to the heat emission of such radiator 115. The thermostat 32 may be of any conventional electrical type, the terminals of its thermally responsive electrical make and break switch being in series electrical connection in the diagrammatically shown wiring circuit 33, said circuit including the electric motor leads 34a and a suitable electrical power source, indicated at 34. As required by conventional practical, any suitable relays or equivalent control devices may be installed. The thermostat 32, when "calling" for heat, initiates the operation of the compressor 29; the flow of compressed air therefrom through the piping 28 actuates the air motor units of the fan assemblies 25.

Figure 2:
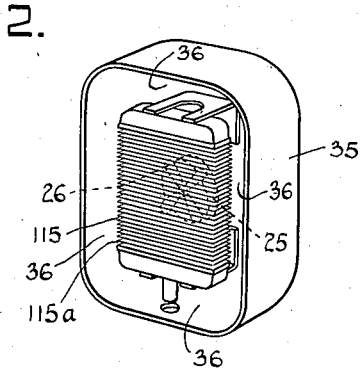
Fig. 2 is a detail view, showing, in perspective, an efficient arrangement of a casing for housing the radiator-fan assembly which typifies a preferred form of heat exchange for use with the heating system.

For efficient cooperative relation of each fan assembly 25 with its radiator 115, the latter may be housed in a suitable substantially imperforate casing 35 as is indicated in Fig. 2, the characteristics of such arrangement being that the radiator 115 is disposed at or adjacent the open front of the casing 35, the facial area of such radiator 15 being less than that of the front opening of the casing. The fan-motor assembly 25 is desirably mounted within the casing 35, as by supporting the same on the rear wall thereof in substantial alignment with the group of fins 115a of the radiator. For most efficient performance, each radiator is disposed substantially symmetrically with respect to the front opening of the casing 35, to thereby afford marginal clearances, see 36, between the bottom, top and lateral faces of the radiator and the bottom, top and lateral walls respectively of the casing. Preferably, the top, bottom, and lateral walls of said substantially imperforate casing, arcuately connect with the rear wall of the said casing. With the fan 26 in operation, the centralized position of the fan assembly 25 and the configuration of the substantially imperforate walls of the casing 35 enforce a recirculation of air from the room, into the rear of the casing 35 via the marginal clearances 36, thence by positive propulsion, through the radiator 15 and in heat-exchange relationship with fins and tubes thereof. Such casing wall configuration precludes any appreciable degree of convection-induced air circulation from the room, over the heat exchange elements of the radiator and thence again out into the room. In other words, during stages of quiescence of the fan 26, and assuming that the radiators have a continuous filling of steam, the only heat emitted from the heat exchange unit is by direct radiation. Such heat emission is necessarily very small, and may be insufficient to have any appreciable heating effect on the air temperature of the room.

The boiler 10 may be of the hand fired, solid fuel combusting type, or may be of the oil or other fluid burning type, as indicated. Desirably, the rate of combustion of the solid fuel, or the periods of fuel flow and ignition of the fluid fuel, is controlled by suitable and conventional pressure-responsive means, such as the "pressurestat" illustrated at 38 in Fig. 1, said pressurestat serving to control, in familiar manner, either the combustion-regulating dampers of the solid-fuel type of burners, or the fuel feed and combustion of an oil or gas-burning boiler. The pressurestat 38 is located at any position affording response to the pressure of steam generated within the boiler; the pressure responsive element of the pressurestat, as is well known, may actuate an electrical make and break switch interposed in the circuit between the power source 34 and the leads 39 to the fuel combustion control system.

A suitable steam pressure at the boiler will insure a continuous steam-filled condition of each of the radiators 15. As has been stated above, the organization of radiator casing means does not permit any appreciable dissemination of heat into the rooms, during any stages of quiescence of the fan 26, despite the continuously heated condition of the radiators 115. However, at the instant of operation of the fan 26, as in the circumstance when the room thermostat 32 is "calling" for heat and has thus initiated operation of the fans 26, air is immediately drawn from the room, passed over the heating surfaces, and positively circulated throughout the room.

The thermostat 32 is illustrated as having a series-switch connection with the power leads 34, and the air compressor 29 and the fuel burner device 10a, connected in parallel with said power circuit, are actuated simultaneously, upon closing of the temperature sensitive switch of thermostat 32. The pressurestat 38 is in series electrical connection with the branch leads 39 serving the fuel burner. The pressurestat 38 establishes an upper limit of boiler steam pressure.

In the conjoint operation of the oil burner and the air compressor, through the action of the thermostat 32, the rapid-steaming characteristics of the boiler 10 may serve, with a suitably controlled discharge of the air compressor 29, to bring steam to the radiator 115 substantially concurrently with the actuation of the fan means 25.

Figure 3:
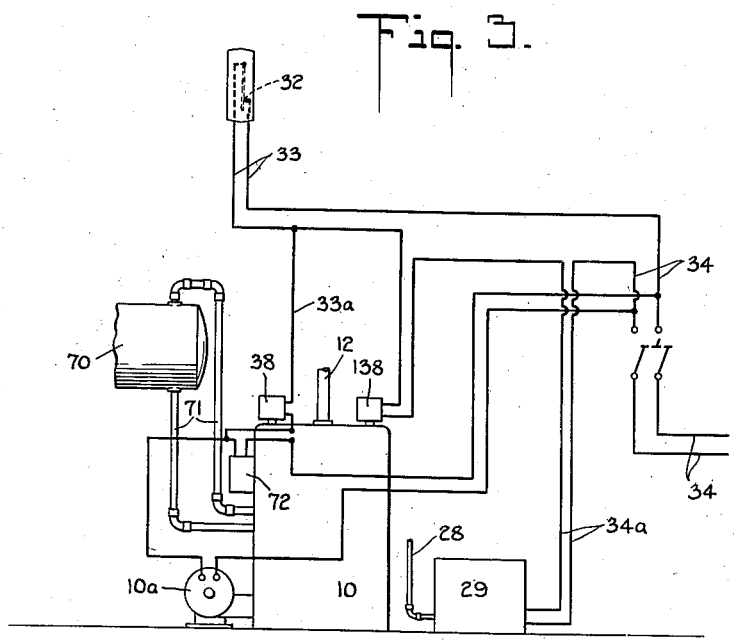
Fig. 3 is a diagrammatic representation of a form of my invention, incorporating an auxiliary heat exchange system for heating water for domestic or other purposes.

Referring to the embodiment illustrated in Fig. 3, the boiler 10, in addition to generating steam for the main heating system, as represented by the fragmentary view of the steam main 12, is a heat source for an auxiliary system for generating and storing, within any suitable tank 70, hot water for domestic or other purposes. In accordance with conventional practice, such secondary system includes circulatory piping 71, suitably connected to a heat exchanger (not shown) which may be arranged within the heat transfer sections of the boiler 10.

In conformity with accepted practice, an aquastat 72 is provided to maintain a temperature condition within the boiler 10, and hence within the heat exchanger of said secondary system, suitable for the heating of domestic water to desired temperature. Such aquastat 72 is operative during the periods when the temperature condition of the building served by the thermostat 32 and the radiators of the heating system is such that the said thermostat is in open circuit status. During periods in which heat is required, the fuel burner 10a will function to generate steam within boiler 10, and hence despite the fact that the upper temperature limit of the aquastat setting may have been exceeded, and the aquastat circuit thereby in open status, control over the generation of steam will be assumed by the thermostat 32 and by the pressurestat 38, the latter serving to establish an upper limit of steam boiler pressure.

In Fig. 3, the thermostat 32 exercises primary control over the stages of operation and non-operation of the fuel burner 10a, and secondary control over the stages of operation of the air compressor 29. The thermostat circuit 33 and the air compressor leads 34a are arranged in series, and in such arrangement, the thermally operated make and break switch of the thermostat 32 is a series-disposed switch. Additionally, there is located, at the boiler, a reverse acting pressurestat 138, said pressurestat constituting a pressure operated electric switch in series in the thermostat-air compressor circuit, and so arranged that until a desired boiler pressure has been attained, its said series-switch remains in open status.

Assuming a condition whereby the thermostat 32 is "calling" for heat, such condition necessitating that the thermally operated switch of said thermostat be closed, the electrical circuit serving the oil burner 10a is closed through the thermostat leads 33 and 33a, through the pressurestat 38, which, being an upper limit control, will be in closed status in the circumstance of an absence of pressure at the boiler, and through the electrical circuit indicated as electrically connecting the oil burner 10a with the power leads 34. The fuel combustion device 10a will thus be activated, causing the generation of steam within the boiler 10. However, the air compressor 29 will remain inoperative until a pressure has been generated at the boiler sufficient to close the series-switch within the pressurestat 138. Thus, the operation of the fan means 25 may be "timed" to correspond to a condition of steam supply within radiators 115.

Upon the attainment of the upper setting of the thermostat 32, the opening of its series-switch will cause an immediate concurrent cessation of operation of the combustion unit 10a and air compressor unit 29.

Figure 4:
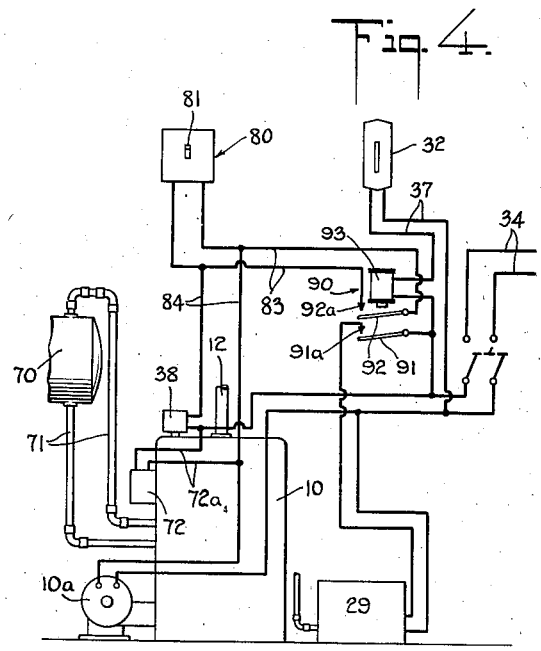
Fig. 4 is a representation of another form of a heating system of the type generally shown in Fig. 3.

In the embodiment of Fig. 4, it is assumed that control over the generation of steam within the boiler 10 is primarily through the operation of the pressurestat 38, and therefore, during a summer month period when by reason of the operation of the aquastat 72 there would be no pressure condition within the boiler 10, the series-switch within the pressurestat 38 would be in closed status, and only the open-circuit "summer" position of the switch 80 would prevent the operation of the fuel burner 10a to a degree affording a condition of steam pressure within the boiler 10.

During the normal heating season, control of the heating of enclosures served by radiators 115 is had by the operation of the room thermostat 32, which serves as a series-connected switch in the circuit controlling the air compressor 29.

In the embodiment of Fig. 4, the thermostat 32 controls the air compressor 29 through the agency of a suitable relay 90, said relay including a plurality of armatures, designated 91, 92, respectively, and therewith associated contact elements 91a, 92a.

The thermostat 32 constitutes a thermally actuated electrical switch in series with the coil 93 of the relay, and therefore when the thermostat is "calling" for heat, each of the respective armatures is pulled into circuit closing position with its associated contact element. The cooperating armature 91 and contact point 91a serve to connect the compressor 29 to the power source 34, and thus suitable operation of the thermostat is effective to start or stop the generation of compressed air. Simultaneously, the cooperating armature 92 and contact 92a close an electrical circuit.

In the embodiment of Fig. 4, the control of fuel combustion is, during the winter season, effected by the pressurestat 38, it being assumed that the switch 80 is in closed position during the heating season. With the series-switch of the pressurestat 38 in closed position until the predetermined upper pressure limit is attained, it is obvious from the illustrated wiring arrangement that the fuel burner 10a will operate until the cut-out pressure of the pressurestat 38 has been reached.

During stages of non-operation of the fuel burner 10a during the normal winter season, the temperature of water within the boiler 10 is controlled by the actuation of the aquastat 72.

As previously stated, during such periods when steam is not normally required at the radiators 115, the switch 80 may be opened, through suitable operation of its switch element 81, to break the electrical circuit of which the pressurestat 38 is a series-connected element. However, if occasion arises during this period when it is desirable to have heat available at the radiators for warming the enclosures, as in the circumstance of a period of cool weather when the temperature at the thermostat would fall to its circuit closing position, it is advantageous to automatically by-pass the then open circuit switch 80. To this end, the armature 92 and associated contact 92a are disposed in a wiring circuit 83, which makes connection, in parallel with the switch 80, with the leads 84, one of which leads is connected to a terminal of the pressurestat 38, and the second of which is connected to a suitable point of connection of the fuel burner 10a. When it is remembered that at the instant of closing circuit through armature 92 and contact 92a the pressurestat switch will be in closed circuit position, it is obvious that the fuel burner 10a will be started simultaneously with the closing of such contact.

Should it be desired to prevent steam generation under all circumstances during the summer month period, any suitable manually operable circuit breaking switch may be installed in the thermostat lead wires 33. Under such circumstance, the operation of the burner 10a will be wholly under the control of the aquastat 72, and generation of hot water will proceed without a possibility of generation of steam within the boiler 10.

It will be understood that the embodiments of Figures 3 and 4 inclusive are represented diagrammatically and in simplest form, with such conventional accessories as transformers, relays, and the like, omitted for clarity. As is well known, the advantages resulting from the employment of low voltage for the thermostat 32 and other of the devices makes it the common practice to employ suitable voltage-reducing devices.

Whereas I have described my invention by reference to specific forms thereof, it will be understood that many changes and modifications may be made without departing from the spirit of the invention.

I claim:

1. A heating system comprising a steam generator, electrically controllable fuel combustion means therefor, a plurality of heat exchange units arranged to be supplied with steam from said steam generator, air driven fan means, electrically controllable means for supplying air for fan operation, means responsive to steam pressure at the steam generator to start operation of the air supplying means, and thermostat means responsive to the heat output of one of said heat exchange units to operate said fuel combustion means to generate said steam pressure and to conjointly stop the operation of said fuel combustion means and said air supplying means.

2. A heating system comprising a steam boiler, controllable fuel combustion means for generating steam pressure within the said boiler, heat exchanger means comprising a radiator arranged to be supplied with steam from said boiler and fan means for circulating air over said radiator, means operatively independent of said steam generator for driving said fan means, thermostat means responsive to heat emission from said heat exchange means to concomitantly control the instants of operation of said fuel combustion means and said fan driving means, and means operatively associated with steam generator, said fuel combustion means and said thermostat means to halt said fuel combustion means at a predetermined pressure condition at such boiler independently of the operative status of said thermostat means.

3. A heating system, comprising a steam boiler, controllable fuel combustion means therefor, heat exchanger means arranged to be supplied with steam from said boiler, fan means operatively associated with said heat exchanger means, controllable means for starting and stopping said fan means, means responsive to the pressure of steam within said boiler and operatively associated with said fuel combustion means to establish an upper limit of steam pressure within said boiler, thermostat means responsive to the temperature of air in an enclosure served by said heat exchanger means and operatively associated with said fan means and with said fuel combustion means to maintain a desired temperature within said enclosure, and means responsive to the temperature of water within said boiler and operatively associated with said fuel combustion means to assume control thereof under conditions wherein the thermostat in said enclosure is satisfied and to maintain a temperature of water within said boiler approaching but not attaining the boiling themperature thereof.

4. A heating system, comprising a steam boiler, controllable fuel combustion means therefor, heat exchanger means arranged to be supplied with steam from said boiler, air driven fan means operatively associated with said heat exchanger means, controllable air compressor means arranged to supply air for driving said fan means, means responsive to the pressure of steam within said boiler and operatively associated with said fuel combustion means to establish an upper limit of steam pressure within said boiler, thermostat means responsive to the temperature of air in an enclosure served by said heat exchanger means and operatively associated with said fan means and with said air compressor means to maintain a desired temperature within said enclosure, and means responsive to the temperature of water within said boiler and operatively associated with said fuel combustion means to assume control thereof under conditions wherein the thermostat in said enclosure is satisfied and to maintain a temperature of water within said boiler approaching but not attaining the boiling temperature thereof.

5. A heating system, comprising a steam boiler, controllable fuel combustion means therefor, heat exchanger means arranged to be supplied with steam from said boiler, fan means operatively associated with said heat exchanger means, controllable means for starting and stopping said fan means, means responsive to the pressure of steam within said boiler and operatively associated with said fuel combustion means to establish an upper limit of steam pressure within said boiler, thermostat means responsive to the temperature of air in an enclosure served by said heat exchanger means and operatively associated with said fan means and with said fuel combustion means to control the periods of operation thereof, means responsive to the pressure of steam within said boiler and operatively associated with said fan means to delay the operation thereof until a desired steam pressure has been attained, and means responsive to the temperature of water within said boiler and operatively associated with said fuel combustion means to assume control thereof under conditions wherein the thermostat in said enclosure is satisfied and to maintain a temperature of water within said boiler approaching but not attaining the boiling temperature thereof.

6. A heating system comprising a steam boiler, electrically controllable fuel combustion means therefor, heat exchanger means arranged to be supplied with steam from said boiler, fan means operatively associated with said heat exchanger means, electrically controllable means for starting and stopping said fan means, electric switch means responsive to the pressure of steam within said boiler and connected in electrical circuit with said fuel combustion means to establish an upper limit of steam pressure within said boiler, electric thermostat means responsive to the temperature of air within an enclosure and in electric circuit with said fan control means for controlling the instants of operation of said fan means, manually operative switch means arranged in an electric circuit with said pressure control means and said fan operation means for temporarily taking out of service said pressure control means and said fan operation means, electric switch means responsive to the temperature of water within said boiler and in electric circuit with said fuel combustion means to assume control thereof under conditions when said pressure means and said fan operation means have been taken out of service by manual operation of said switch, and means operatively associated with said thermostat, said fuel combustion means, and said fan operation means to operate said combustion means and said fan means to disseminate heat into the enclosure regardless of the electric circuit status of said manually operative electric switch means.

EDWARD S. CORNELL, Jr.